United States Patent Office 3,829,427
Patented Aug. 13, 1974

3,829,427
8-ARYL-3-AZABICYCLO-[3,3,1]-NONANES
Adrian Charles Ward Curran, Reading, England, assignor to John Wyeth & Brother Limited, Berkshire, England
No Drawing. Filed Aug. 30, 1972, Ser. No. 284,819
Claims priority, application Great Britain, Sept. 10, 1971, 42,269/71
Int. Cl. C07d 39/00
U.S. Cl. 260—293.54                    9 Claims

ABSTRACT OF THE DISCLOSURE

The invention provides novel 8-aryl-3-azabicyclo-[3,3,1]-nonanes.

The novel compounds possess one or more of the following pharmacological activities; anti-ulcer activity, inhibition of blood platelet adhesion or aggregation or CNS depressant activity, or are intermediates for pharmacologically valuable compounds.

---

The invention relates to novel heterocyclic compounds and in particular 8-aryl-3-azabicyclo-[3,3,1]-nonanes. The compounds either have valuable pharmacological activity, for example as anti-ulcer agents, or are intermediates for pharmacologically active compounds.

According to the invention there are provided compounds of the general formula (I)

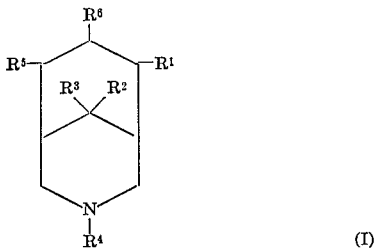

(I)

wherein $R^1$ is a pyrrolidino, piperidino, morpholino or 4-methyl-piperazino radical, any of which may be substituted by a lower alkyl radical or $R^1$ is an amino group substituted by one or two lower alkyl groups; $R^2$ is hydroxy, acyloxy or an ether group (e.g. lower alkoxy); $R^3$ is a hydrogen atom or an alkyl, aryl or aralkyl radical any of which radicals may be substituted (e.g. by alkyl or alkoxy radicals); or $R^2$ and $R^3$ when taken together form an oxo group; $R^4$ is hydrogen, alkyl, aralkyl, or acyl, $R^5$ is aryl which may be substituted by a halogen atom or an alkyl, alkoxy, hydroxy or haloalkyl (e.g. trifluoromethyl) radical; $R^6$ is hydrogen or lower alkyl and the pharmaceutically acceptable salts thereof.

Where the compounds of formula I contain an alkyl substituent it is preferred that this is a lower alkyl radical, which may have a straight or branched chain, having from 1 to 6 carbon atoms e.g. methyl, ethyl, propyl or butyl. The term alkyl radical is also intended to embrace cyclic alkyl radicals e.g. cyclobutyl, cyclopentyl and cyclohexyl.

It is preferred that $R^1$ is an unsubstituted pyrrolidino radical.

Examples of acyloxy groups for $R^2$ are radicals derived from aliphatic carboxylic acids which may be unsaturated and/or may be substituted e.g. by substituted or unsubstituted aryl or hydroxy radical. Such acyl radicals include lower alkanoyloxy e.g. acetoxy, and p-nitro cinnamoyloxy. $R^2$ may be a radical derived from an aromatic carboxylic acid e.g. benzoyloxy which may be substituted e.g. by a nitro group.

When $R^4$ is alkyl or aralkyl, the alkyl group or portion is preferably a lower alkyl group of 1 to 6 carbon atoms. Examples of $R^4$ are methyl, benzyl and phenethyl radicals. When $R^4$ is acyl it may be an acyl group, derived from a lower aliphatic carboxylic acid, such as a lower alkanoyl group or from an aromatic carboxylic acid, such as a benzoyl group.

Examples of $R^5$ are phenyl, tolyl, xylyl. $R^6$ may be a methyl group.

The compounds of formula (I) can form acid addition salts with inorganic acids e.g. hydrochloric, hydrobromic, sulphuric and nitric acid or organic acids e.g. oxalic, fumaric, maleic and tartaric acid. All these salts are included within the invention.

The invention further provides a process for preparing compounds of formula (I) wherein $R^2$ and $R^3$ taken together form an oxo group which process comprises reacting a tetrahydropyridine compound of formula:

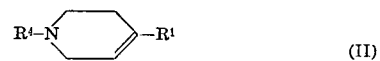

(II)

with an unsaturated aldehyde of formula:

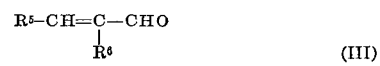

(III)

wherein $R^1$, $R^4$, $R^5$ and $R^6$ are as defined above.

The starting compounds of formulae II and III are known compounds or can be obtained by standard methods from known compounds. Other compounds of formula I can be prepared by the following processes all of which are included within the invention. Compounds of the formula (I), wherein $R^3$ is a hydrogen atom and $R^2$ is a hydroxy group can be prepared by reduction of the corresponding compounds where $R^2$ and $R^3$ together form an oxo group. Standard reducing agents for the reduction of ketones to alcohols can be used for example alkali metal borohydrides, e.g. sodium borohydride in a suitable solvent such as methanol or ethanol, lithium aluminum hydride in a solvent e.g. diethyl ether or tetrahydrofuran, sodium amalgam or by catalytic reduction in the presence of e.g. platinum oxide.

Compounds of formula (I) wherein $R^3$ is an alkyl, aryl, or aralkyl radical (substituted or not) and $R^2$ is a hydroxy group may be prepared by alkylation of a compound of formula I wherein $R^3$ and $R^2$ together form an oxo group using standard alkylating agents e.g. a Grignard reagent of formula $R^3$ MgHal where Hal denotes a halogen preferably bromine, or a lithium compound of formula $R^3$ Li. Standard conditions are used for this reaction e.g. treating a solution of the 9-oxo compound in dry ether or tetrahydrofuran with the alkylating agent followed by refluxing for an appropriate time. The products are isolated by standard procedures.

Where $R^2$ is hydroxy this group may be acylated or etherified to give the corresponding compounds where $R^2$ is an acyloxy or ether group. Standard techniques for the acylation of a secondary or tertiary hydroxyl group, as the case may be, are used. The acylating agent may be a halide or anhydride of the acid containing the appropriate residue.

Where $R^4$ is alkyl or aralkyl the compounds are preferably prepared from a compound of formula (II) containing the appropriate radical $R^4$ by the process described above for preparing the 9-oxo compounds, with after processes being effected if necessary. Alternatively an alkyl or aralkyl group $R^4$ may be introduced by direct alkylation of a compound of formula I where $R^4$ is hydrogen using standard methods for the alkylation of a secondary amine.

Compounds of formula I in which $R^4$ is an acyl group are preferably prepared by acylation of a corresponding compound wherein $R^4$ is hydrogen, employing standard procedure for acylation of a secondary amine.

Representative compounds of formula I have been shown to possess pharmacological activity e.g. anti-ulcer activity, inhibition of blood platetlet adhesion or aggregation or CNS depressant activity. The anti-ulcer activity was determined by the method of Brodie and Hanson, Gastroenterology 15, 1, 1960. In this test compounds of formula I where $R^2$ is hydroxy and $R^3$ is hydrogen generally displayed activity, especially where $R^4$ is a benzyl group.

A particularly valuable compound of the invention as shown by the anti-ulcer activity test, is 3-benzyl-9-hydroxy-8-phenyl-6-pyrrolidino-3-azabicyclo [3,3,1] nonane and its pharmaceutically acceptable salts. This compound was also found to lack anticholinergic activity which is a disadvantageous side-effect in an anti-ulcer agent.

The compounds of formula (I) generally possess the ability to inhibit blood platelet aggregation or adhesion in an *in vivo* test similar to that of Born & Cross, J. Physiol. *168,* 178–195 (1963). They also possess general central nervous system depressant activity as shown by the inhibition of spontaneous motor activity and by potentiation of hexabarbitone sleep.

The invention includes pharmaceutical compositions containing a compound of formula I, or a pharmaceutically acceptable salt thereof, and a pharmaceutical carrier. Any suitable carrier know in the art can be used to prepare the pharmaceutical compositions. In such a composition, the carrier may be a solid, liquid or mixture of a solid and liquid. Solid form compositions include powders, tablets and capsules. A solid carrier can be one or more substances which may also act as flavoring agents, lubricants, solubilisers, suspending agents, binders, or tablet-distintegrating agents; it can also be an encapsulating material. In powders the carrier is a finely divided solid which is in admixture with the finely divided active ingredient. In tablets the active ingredient is mixed with a carrier having the necessary binding properties in suitable proportions and compacted in the shape and size desired. The powders and tablets preferably contain from 5 to 99, preferably 10–80% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, and cocoa butter. The term "composition" is intended to include the formulation of an active ingredient with encapsulating material as carrier to give a capsule in which the active ingredient (with or without other carriers) is surrounded by carrier, which is thus in association with it. Similarly cachets are included.

Sterile liquid form compositions include sterile solutions, suspensions, emulsions, syrups and elixirs. The active ingredient can be dissolved or suspended in a pharmaceutically acceptable sterile liquid carrier, such as sterile water, sterile organic solvent or a mixture of both. Preferably a liquid carrier is one suitable for parenteral injection. Where the active ingredient is sufficiently soluble it can be dissolved in normal saline as a carrier; if it is too insoluble for this it can often be dissolved in a suitable organic solvent, for instance aqueous propylene glycol or polyethylene glycol solutions. Aqueous propylene glycol containing from 10 to 75% of the glycol by weight is generally suitable. In other instances compositions can be made by dispersing the finely-divide active ingredient in aqueous starch or sodium carboxymethyl cellulose solution, or in a suitable oil, for instance arachis oil.

Preferably the pharmaceutical composition is in unit dosage form. In such form, the composition is subdivided in unit doses containing appropriate quantities of the active ingredient; the unit dosage form can be a packaged composition, the package containing specific quantities of compositions, for example packeted powders or vials or ampoules. The unit dosage form can be a capsule, cachet or tablet itself, or it can be the appropriate number of any of these in packaged form. The quantity of active ingredient in a unit dose of composition may be varied or adjusted from 5 mg. or less to 500 or more, according to the particular need and the activity of the active ingredient. The invention also includes the compounds in the absence of carrier where the compounds are in unit dosage form.

When used as anti-ulcer agents the compounds of the invention will be administtred orally in either liquid or solid composition form. The following examples illustrate the invention:

EXAMPLE 1

3-Benzyl-9-oxo-8-phenyl-6-pyrrolidino-3-azabicyclo [3,3,1]nonane

A solution of 1-benzyl-4-pyrrolidino-1,2,3,6-tetrahydropyridine (12 gm., 0.05 m.) in dioxane (50 ml.) was cooled to 0° C. and treated with cinnamaldehyde (6.5 gm., 0.05 m.) over 10 mins. The mixture was heated under reflux for 36 hours, cooled and the solvent removed *in vacuo*. The residual oil was diluted with water (30 ml.) and heated on a steam bath for 2 hours. The cooled reaction mixture was extracted into methylene chloride (2 × 100 ml.) and the combined extracts washed with 2N HCl (2 × 50 ml.) and the combined washings made basic with solid $K_2CO_3$ and extracted with ethyl acetate (3 × 100 ml.). The combined extracts were washed with water, dried ($MgSO_4$) and evaporated to dryness *in vacuo*. The residual oil was re-dissolved in ether and treated with dry HCl gas and the solid filtered and recrystallised from methanol-ether giving the bis hydrochloride of the title compound as colourless needles (9 gm., 40%), m.p. 85° C. (Found: C, 65.5; H, 7.2; N, 6.4. $C_{25}H_{30}N_2O.2HCl.½H_2O$ requires C, 65.8; H, 7.3; N, 6.2%).

EXAMPLE 2

3-Benzyl-9-hydroxy-8-phenyl-6-pyrrolidino-3-azabicyclo [3,3,1]nonane

An ice-cooled solution of 3-benzyl-9-oxo-8-phenyl-6-pyrrolidino-3-azabicyclo[3,3,1]nonane (26 gm., 0.07 m.) in methanol (200 ml.) was treated with sodium borohydride (3 gm., 0.08 m.) over 1 hour and the reaction mixture stirred at 25° C. for a further 16 hours. The solvent was removed *in vacuo* and the residual oil diluted with water (100 ml.) and extracted with ethyl acetate (3 × 100 ml.). The combined extracts were washed with water, dried ($MgSO_4$) and the solvent removed *in vacuo*. The residual solid was recrystallised from methanol giving the title compound as colourless needles (18 gm., 64%), m.p. 192° C. (Found: C, 80.2; H, 8.8; N, 7.5. $C_{25}H_{32}N_2O$ requires C, 79.8; H, 8.6; N, 7.4%). The bis hydrochloride was prepared as described for the compound of Example 1 and recrystallised as the trihydrate from a mixture of methanol and ether as a white powder, m.p. 129° C. (Found: C, 59.4; H, 7.8; N, 5.2. $C_{25}H_{32}N_2O.2HCl.3H_2O$ requires C, 59.6; H, 8.0; N, 5.6%).

EXAMPLE 3

9-Acetoxy-3-benzyl-8-phenyl-6-pyrrolidino-3-azabicyclo [3,3,1]nonane

9 - Hydroxy - 3 - benzyl-8-phenyl-6-pyrrolidino-3-azabicyclo[3,3,1]nonane (4.8 gm., 0.012 m.) was treated with acetic anhydride (15 ml.) and pyridine (20 ml.) and the mixture stirred for 18 hours at 25° C. The volatile material was removed *in vacuo* and the residue diluted with ice-water (10 ml.). The pH was then adjusted to 9 with solid $K_2CO_3$ and the solution extracted with methylene chloride (3 × 50 ml.). The combined extracts were washed with water, dried ($MgSO_4$) and evaporated *in vacuo*. The residual oil was dissolved in ether and treated with dry HCl gas. The solid was filtered and recrystallised from methanol/ether giving the bis hydrochloride of the title compound as a white powder (3.5 gm., 68%), m.p. 184° C. (Found: C, 62.1; H, 7.5; N, 5.1.

$$C_{27}H_{34}N_2O_2 \cdot 2HCl \cdot 1½H_2O$$

requires C, 62.5; H, 7.6; N, 5.4%).

EXAMPLE 4

3-Benzyl-8-phenyl-6-pyrrolidino-3-azabicyclo[3,3,1]nonan-9-yl benzilate hydrochloride A mixture of 3-benzyl-8-phenyl-6-pyrrolidino-9-hydroxy-3-azabicyclo[3,3,1]nonane (2 gm., 0.005 m.), ethylbenzilate (5.3 gm.) and sodium (0.01 gm.) were heated at 170° C. under reduced pressure (14 mm. Hg) for 18 hours. The cooled reaction mixture was diluted with chloroform (100 ml.) and acidified with 2N HCl. The solid was filtered and recrystallised from methanol to afford the title compound as colourless needles (2.4 gm., 75%), m.p. 236° C. (Found: C, 73.5; H, 7.0; N, 4.3.

$$C_{39}H_{42}N_2O_3 \cdot HCl \cdot H_2O$$

requires C, 73.2; H, 7.0; N, 4.4%).

EXAMPLE 5

9-Hydroxy-8-phenyl-6-pyrrolidino-3-azabicyclo[3,3,1]nonane dihydrochloride

A solution of 3-benzyl-9-hydroxy-8-phenyl-6-pyrrolidino-3-azabicyclo[3,3,1]nonane dihydrochloride (9 gm., 0.02 m.) was dissolved in isopropyl alcohol (100 ml.) and hydrogenated over 10% palladium-on-charcoal catalyst (1 gm.) at 50 p.s.i. and 60° C. until the uptake of hydrogen ceased (3 hours). The catalyst was removed, washed with isopropyl alcohol and the combined filtrates evaporated to dryness in vacuo. The residual solid was recrystallised from methanol giving the title compound as colourless needles (6 gm., 82%), m.p. 259° C. (Found: C, 59.2; H, 81.1; N, 7.6. $C_{18}H_{26}N_2O \cdot 2HCl \cdot ¼H_2O$ requires C, 59.4; H, 7.9; N, 7.7%).

EXAMPLE 6

9-Hydroxy-3-phenethyl-8-phenyl-6-pyrrolidino-3-azabicyclo[3,3,1]nonane

A mixture of 9-hydroxy-8-phenyl-6-pyrrolidino-3-azabicyclo[3,3,1]nonane (2.5 gm., 8.7×10⁻³ m.), phenethylbromide (1.8 gm., 0.01 m.) and potassium carbonate (5.7 gm.) in sec.-butyl alcohol (30 ml.) was heated at reflux temperature for 18 hours, cooled filtered and the filtrate evaporated to dryness in vacuo. The residual solid was recrystallised from aqueous methanol giving the title compound as colourless needles (1.6 gm., 46%), m.p. 91° C. (Found: C, 77.9; H, 9.0; N, 7.3. $C_{26}H_{34}N_2O \cdot ½H_2O$ requires C, 78.1; H, 8.8; N, 7.0%).

EXAMPLE 7

3-Benzoyl-9-hydroxy-8-phenyl-6-pyrrolidino-3-azabicyclo[3,3,1]nonane hydrochloride A mixture of 9-hydroxy-8-phenyl-6-pyrrolidino-3-azabicyclo[3,3,1]nonane (2.5 gm., 8.7×10⁻³ m.), benzoic anhydride (2 gm., 8.7×10⁻³ m.) and triethylamine (0.9 ml.) in dry benzene (15 ml.) was heated at reflux temperature for 18 hours, cooled and the volatile material removed in vacuo. The residual oil was dissolved in 2N HCl (50 ml.) and washed with ether (3× 50 ml.). The pH was adjusted to 10 with solid K₂CO₃ and extracted with chloroform (3× 50 ml.) and the combined extracts washed with water, dried (MgSO₄) and evaporated to dryness in vacuo. The residual oil was re-dissolved in ether (100 ml.) and treated with dry HCl gas. The solid was filtered and recrystallised from methanol giving the title compound as colourless plates (2.1 gm., 56%), m.p. 208° C. (Found: C, 70.4; H, 7.3; N, 6.6. $C_{25}H_{30}N_2O_2 \cdot HCl$ requires C, 70.3; H, 7.3; N, 6.6%).

EXAMPLE 8

9-Hydroxy-3-methyl-6-pyrrolidino-8-phenyl-3-azabicyclo[3,3,1]nonane bis-hydrochloride An ice cooled solution of 1-methyl-4-pyrrolidino-1,2,3,6-tetrahydropyridine (13.5 gm., 0.08 m.) in benzene (200 ml.) was treated with a solution of cinnamaldehyde (10.56 gm., 0.08 m.) in benzene (40 ml.) over 10 minutes with stirring. The mixture was heated at reflux temperature for 36 hours, cooled and the benzene removed in vacuo. The residual oil was dissolved in 2N HCl (50 ml.), washed with ether (2× 50 ml.), made basic with solid K₂CO₃ and extracted with ether (3× 50 ml.). The combined ethereal extracts were washed with water, dried (MgSO₄) and the ether removed in vacuo to give an oily residue (16.5 gm.) which was reduced with sodium borohydride (6 gm.) in methanol (300 ml.) as described in Example 2. The product was dissolved in anhydrous ether, treated with dry HCl gas and the solid filtered. Recrystallisation from ethanol-ether gave the title compound as colourless needles (4.8 gm., 22%) m.p. 288° C. (Found: C, 61.1; H, 8.30, N, 7.5. $C_{19}H_{28}N_2O \cdot 2HCl$ requires C, 61.2; H, 8.1; N, 7.5%).

EXAMPLE 9

3-Benzyl-9-oxo-8-phenyl-6-piperidino-3-azabicyclo[3,3,1]nonane

The title compound was prepared from 1-benzyl-4-piperidino-1,2,3,6-tetrahydropyridine (12.27 gm., 0.05 m.) and cinnamaldehyde (6.3 gm., 0.05 m.) according to the general procedure described in Example 1 and isolated as the fumarate (8.6 gm., 35%), m.p. 195° C. (isopropyl alcohol). (Found C, 71.8; H, 7.3; N, 5.5.

$$C_{26}H_{32}N_2O \cdot C_4H_4O_4$$

requires C, 71.4; H, 7.2; N, 5.6%).

EXAMPLE 10

3-Benzyl-9-hydroxy-8-phenyl-6-piperidino-3-azabicyclo[3,3,1]nonane

The title compound was prepared from 3-benzyl-9-oxo-8-phenyl - 6 - piperidino - 3 - azabicyclo[3,3,1]nonane (3.9 gm., 0.01 m.) by reduction with sodium borohydride (0.37 gm., 0.01 m.) in methanol (15 ml.) according to the general method described in Example 2. The title compound was isolated as the dihydrochloride (2.6 gm., 56%), m.p. 252° C. (ethanol-ether). (Found: C, 67.1; H, 8.0; N, 6.0. $C_{26}H_{34}N_2O \cdot 2HCl$ requires C, 67.3; H, 7.8; N, 6.1%).

EXAMPLE 11

3-Benzyl-9-hydroxy-8,9-diphenyl-6-pyrrolidino-3-azabicyclo[3,3,1]nonane hydrochloride An ice-cooled solution of phenyl magnesium bromide [prepared from bromobenzene (9.8 gm.) and magnesium (1.6 gm.) in dry tetrahydrofuran (50 ml.)] was treated dropwise with a solution of 3-benzyl-9-oxo-8-phenyl-6-pyrrolidino - 3 - azabicyclo[3,3,1]nonane (14 gm., 0.037 m.) in anhydrous tetrahydrofuran and the mixture heated at reflux temperature for 4 hours. The cooled reaction mixture was treated with a saturated solution of ammonium chloride (50 ml.) and the organic layer separated, dried (MgSO₄) and evaporated in vacuo. The residual solid was recrystallised from ethanol to give the title compound as colourless needles (9 gm., 49%), m.p. 208° C. (Found: C, 75.4; H, 7.5; N, 5.5. $C_{31}H_{34}N_2O \cdot HCl \cdot ½H_2O$ requires C, 75.1; H, 7.3; N, 5.6%).

EXAMPLE 12

9-Hydroxy-8,9-diphenyl-6-pyrrolidino-3-azabicyclo[3,3,1]nonane dihydrochloride

A solution of 3-benzyl - 8,9 - diphenyl-9-hydroxy-6-pyrrolidino - 3 - azabicyclo[3,3,1]nonane monohydrochloride (3.1 gm., 6×10⁻³ m.) was hydrogenated at 50 p.s.i.

and 60° C. over 10% palladium-on-charcoal in isopropyl alcohol (50 ml.) in similar manner to that described in Example 5, the product being isolated in the same way, giving the title compound as a white powder (2.7 gm., 94%), m.p. 217° C. (methanol-ether). (Found: C, 64.4; H, 7.4; N, 6.3. $C_{24}H_{29}N_2O \cdot 2HCl \cdot \frac{1}{2}H_2O$ requires C, 64.7; H, 7.5; N, 6.3%).

EXAMPLE 13

3-Benzoyl-9-hydroxy-8,9-diphenyl-6-pyrrolidino-3-azabicyclo[3,3,1]nonane

A mixture of 9-hydroxy-8,9-diphenyl-6-pyrrolidino-3-azabicyclo[3,3,1]nonane (2 gm., 0.005 m.), benzoic anhydride (1.25 gm., 0.005 m.) and triethylamine (0.7 ml.) in benzene (10 ml.) was heated at reflux temperature for 18 hours, cooled and the volatiles removed *in vacuo*. The residual oil was redissolved in 2N hydrochloric acid (50 ml.) and washed with ether (3× 50 ml.) and the washings discarded. The aqueous solution was made basic with solid potassium carbonate and extracted with chloroform (3× 50 ml.). The combined chloroform extracts were washed with water, dried ($MgSO_4$) and evaporated *in vacuo*. The residual solid was recrystallised from benzene-petroleum ether (60–80° C.) to give the title compound as colourless needles (1.6 gm., 62%), m.p. 206–8° C. (Found: C, 80.05; H, 7.5; N, 5.9. $C_{31}H_{34}N_2O_2$ requires C, 79.8; H, 7.3; N, 6.0%).

I claim:
1. A compound selected from the group consisting of compounds of the formula

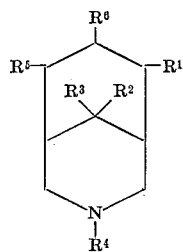

wherein $R^1$ is a member of the group consisting of pyrrolidino and piperidino, $R^2$ is hydroxy; $R^3$ is a member of the group consisting of hydrogen and phenyl, or $R^2$ and $R^3$ when taken together represent an oxo radical; $R^4$ is a member of the group consisting of hydrogen, benzyl and benzoyl; $R^5$ is phenyl and $R^6$ is hydrogen; and the pharmaceutically acceptable salts of said compounds.

2. A compound as claimed in claim 1 which is 3-benzyl-9 - oxo - 8 - phenyl - 6 - piperidino - 3-azabicyclo - [3,3,1]-nonane.

3. A compound as claimed in claim 1, which is 3-benzyl-9 - oxo - 8 - phenyl - 6 - pyrrolidino - 3 - azabicyclo-[3,3,1]-nonane.

4. A compound as claimed in claim 1 which is 3-benzyl-9 - hydroxy - 8 - phenyl - 6 - pyrrolidino - 3 - azabicyclo-[3,3,1]-nonane.

5. A compound as claimed in claim 1 which is 3-benzoyl - 9 - hydroxy - 8 - phenyl - 6 - pyrrolidino - 3 - azabicyclo-[3,3,1]-nonane.

6. A compound as claimed in claim 1 which is 3-benzyl-9 - hydroxy - 8 - phenyl - 6 - piperidino - 3 - azabicyclo-[3,3,1]-nonane.

7. A compound as claimed in claim 1 which is 3-benzyl-9 - hydroxy - 8,9 - diphenyl - 6 - pyrrolidino - 3 - azabicyclo-[3,3,1]-nonane.

8. A compound as claimed in claim 1 which is 9-hydroxy - 8,9 - diphenyl - 6 - pyrrolidino - 3 - azabicyclo-[3,3,1]-nonane.

9. A compound as claimed in claim 1 which is 3-benzoyl - 9 - hydroxy - 8,9 - diphenyl - 6 - pyrrolidino - 3-azabicyclo[3,3,1]-nonane.

References Cited

UNITED STATES PATENTS 3,502,669   3/1970   Nakanishi et al. _ _ _ _ 260—247.5

G. THOMAS TODD, Primary Examiner

U.S. Cl. X.R.

260—247.2 B, 247.7 E, 247.7 A, 268 BF; 424—248, 250, 267